United States Patent
Lee et al.

(10) Patent No.: US 6,667,962 B1
(45) Date of Patent: Dec. 23, 2003

(54) METHOD FOR RECOVERING DROPPED CALL IN MOBILE STATION FOR CDMA SYSTEM AND METHOD FOR INFORMING RECOVERY OF THE DROPPED CALL

(75) Inventors: Jeong-Goo Lee, Songnam-shi (KR); Seok-Jin Ham, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/553,189

(22) Filed: Apr. 20, 2000

(30) Foreign Application Priority Data

Apr. 20, 1999 (KR) .......................... 1999-14025
Jul. 15, 1999 (KR) .......................... 1999-28662

(51) Int. Cl.$^7$ .............................................. H04J 13/00
(52) U.S. Cl. ........................................ 370/335; 370/342
(58) Field of Search ............................. 370/320, 335, 370/332, 331, 342; 455/434, 436, 414.1, 423, 437; 379/60, 63, 58

(56) References Cited

U.S. PATENT DOCUMENTS

| | | | |
|---|---|---|---|
| 4,811,380 A | * | 3/1989 | Spear ........................ 455/437 |
| 5,544,224 A | * | 8/1996 | Jonsson et al. .............. 455/434 |
| 5,590,177 A | * | 12/1996 | Vilmur et al. ............... 455/436 |
| 5,649,000 A | * | 7/1997 | Lee et al. .................... 455/436 |
| 5,995,830 A | * | 11/1999 | Amin et al. ................. 455/423 |
| 6,246,872 B1 | * | 6/2001 | Lee et al. ................. 455/414.1 |
| 6,445,918 B1 | * | 9/2002 | Hellander .................... 455/423 |

* cited by examiner

*Primary Examiner*—Kenneth Vanderpuye
*Assistant Examiner*—Joshua Kading
(74) *Attorney, Agent, or Firm*—Dilworth & Barrese, LLP

(57) ABSTRACT

A novel mobile station for a CDMA system does not repeat initial pilot acquisition, when a call is abnormally released. The mobile station performs energy measurement on PN offset values of the neighbor base stations, received from the previous service base station, to determine a reference active sector. Based on whether the determined sector is identical to the previous reference active sector, call re-origination is performed from the sync channel state or the paging channel state. Accordingly, the user shouldn't have to redial and wait for a long time until the call re-origination is performed successfully. In addition, the mobile station does not need to perform initial pilot acquisition unnecessarily, and can reduce the time required for recovering the dropped call.

10 Claims, 7 Drawing Sheets

METHOD FOR RECOVERING DROPPED CALL IN MOBILE STATION FOR CDMA SYSTEM AND METHOD FOR INFORMING RECOVERY OF THE DROPPED CALL

PRIORITY

This application claims priority to an application entitled "Method for Recovering Dropped Call in Mobile Station for CDMA System and Method for Informing Recovery of the Dropped Call" filed in the Korean Industrial Property Office on Apr. 20, 1999 and assigned Serial No. 99-14025, the contents of which are hereby incorporated by reference. Further, this application claims priority to an application entitled "Method for recovering a dropped call informing the recovering state of mobile station in CODE division multiple access system" filed in the Korean Industrial Property Office on Jul. 15, 1999 and assigned Ser. No. 99-28662, the contents of which are hereby incorporated by reference.

BACKGROUND OF THE INVENTION

1. Field of the Invention

The present invention relates generally to a code division multiple access (CDMA) system, and in particular, to a method for automatically recovering a dropped call in a mobile station and indicating a recovering situation of the dropped call.

2. Description of the Related Art

In general, the operation of a mobile station in a CDMA system can be divided into a main control task, a search task and a user interface task. The main control task initiates every task included in the mobile station and controls operation of each task. The search task searches pilot channels, assigns fingers, and manages sets of active sectors, candidate sectors and neighbor sectors. The user interface task receives function key data input by the user and displays an operating state of the mobile station.

Meanwhile, upon power-on, the mobile station should acquire synchronization of a received pilot signal to properly demodulate received data through channel decoding and deinterleaving. Therefore, the mobile station searches pilot signals received from several base stations through a radio channel, performs initial synchronization for synchronizing a PN phase of the mobile station to a phase of the base station's having the highest energy, and continuously detects a multipath signal having energy above a specified level for a soft handoff in the corresponding state. Here, the initial synchronization and multipath signal detection are performed by a searcher included in the mobile station under the control of the search task.

In such a CDMA system, the mobile station disconnects a communication link, when the channel environment deteriorates abruptly, considerable attenuation of the signal resulting in the loss of signal reception occurs, or when a call is dropped due to abnormal power control or the control is unavailable due to an abnormal handoff condition. That is, when a call is dropped (or the communication channel is disconnected), the mobile station of the conventional CDMA system forcedly releases the call without recovering the dropped call.

FIG. 1 shows a procedure for processing a dropped call in the conventional main control task. FIG. 2 shows a state transition diagram of the conventional search task.

In FIG. 2, the search task operates under the control of the main control task. As illustrated, when the search task succeeds in acquisition of a pilot signal having the highest energy in a pilot acquisition state 230, the search task transitions to a sync channel state 240 to receive a sync channel message from a base station (referred to hereinafter as a service base station) corresponding to the pilot signal. Further, the mobile station demodulates the sync channel message to acquire a system time, a long code state, a paging channel data rate and other parameters. After successful demodulation of the sync channel message, the search task transitions to a paging channel state 260. The search task then monitors a paging channel messages in the paging channel state to examine whether a paging message is received or not, and demodulates the paging channel signal to acquire system parameter information such as environment information of the target base station and the mobile station. Here, if the mobile station is assigned to operate in a dedicated time slot, the search task receives only the specific slot assigned thereto and transitions to an idle sleep state 60 to conserve power in the mobile station during other time slots.

Meanwhile, the search task manages various information about the service base station, in which the mobile station is presently registered in the paging channel state 260, and the neighbor base stations. The information includes information about the service base station (i.e., active sector) for transmitting the present paging channel message, information about the neighbor sector which may be used for a handoff, information about pilot channel energy transmitted from the neighbor base stations and information about a PN offset of each base station. The pilot channel energy level is used as a reference value for determining whether to perform a handoff.

In addition, the search task's energy measurement for active sectors, candidate sectors and neighbor sectors, and storage of the measured energy are performed, even during a call of the mobile station, i.e., in a traffic channel state 270. This is because it is necessary to perform continuous energy measurement and management on several base stations to secure a handoff without dropping the call and to dynamically cope with external channel environments.

The mobile station periodically stays in the paging channel state 260 to secure pilot offset information about the neighbor base stations, such as a neighbor list, through demodulation of the paging channel message. Further, during a call, the mobile station secures pilot offset information about the neighbor base stations through the traffic channel message.

Meanwhile, when a paging message is received from the service base station or the mobile station user originates a call during the paging channel state 260, the mobile station and the service base station establish a communication link and exchange various data. When such a call is released normally, the search task selects a base station having the highest energy out of the active, candidate and neighbor sectors managed in the traffic channel state 270 as a reference active sector, and t hen transitions to a sync channel state 240 via an unslew state 280, during which the search task selects the base station having the highest energy. Further, after receiving a sync channel message from the base station corresponding to the selected reference active sector, the search task stays in the paging channel state 260 to conserve power until a paging message is received or a call is originated.

During the call, it is important that the base station signals having sufficiently high energy should be assigned continuously and frequently to the hardware fingers included in the mobile station. In this way, it is possible to maintain a high-quality call to prevent dropping of the call. However, when there is considerable signal attenuation, or it is impossible to receive a signal due to abrupt deterioration of channel environments, data demodulation cannot be performed normally. Therefore, when bad frames are received continuously over a predetermined time period, the mobile station conventionally abandons data demodulation and releases the communication link. That is, when bad frames are received continuously over a predetermined time period, the conventional mobile station ceases data demodulation, assuming that the call is dropped. In other words, when an abnormal call drop is detected during a conversation state 40 of FIG. 1, the main control task of the mobile station transitions from a release substate 45 to a system determination substate 11 as shown in FIG. 1. Further, the mobile station performs initial pilot signal acquisition again in the pilot acquisition state 230 of FIG. 2. Therefore, conventionally, when the call is dropped, there is no way of effectively and automatically recovering the dropped call, so that the mobile station releases the call-dropped communication link and performs the initial pilot acquisition again. In addition, the call is released, unless the user retries call origination.

As stated above, when the communication channel is released, the mobile station of the conventional CDMA system forcedly releases the call rather than recovering the released channel, requiring the user to retry call origination in order to re-establish the released communication link. This presents an inconvenience to the user. In addition, the mobile station of the conventional CDMA system requires a relatively long time to establish initial pilot acquisition in the pilot acquisition state 230 before retrying call origination. Further, for the user to retry call origination over an access channel, the mobile station should detect a PN offset of a base station by demodulating a sync channel message, and detect various system parameters by demodulating a paging channel message.

As described above, when the user retries call origination after the call is abnormally released, the mobile station requires at least 4 or 5 seconds to establish initial pilot acquisition in the pilot acquisition state 230, and additionally, demodulation of a sync channel message and a paging channel message is required. Therefore, in the conventional CDMA system, when the call is abnormally released, the mobile station performs several unnecessary operations and the user is inconveniently required to redial and wait for a long time before the call is successfully re-established.

A more detailed description will now be made regarding how the mobile station operates when the call is released normally in a CDMA system, to help illustrate the difference between the present invention and the prior art.

When a call is normally released, the search task included in the mobile station selects one sector having the highest energy value out of the presently managed active, candidate and neighbor sectors. Thereafter, the search task slews the system time to a PN offset time of the base station corresponding to the selected sector. These actions are done in slew state. This is a previous operation of a multipath search for demodulation of a sync channel from the base station corresponding to the selected sector after the search task enters the sync channel state.

Further, if the mobile station informs the user of a call recovering state in a predetermined method while automatically recovering the dropped call, the user can be easily aware that the dropped call is presently reconnected. This eliminates the requirement for the user to redial, since the mobile station automatically re-established the call.

SUMMARY OF THE INVENTION

It is, therefore, an object of the present invention to provide a method for automatically recovering a call which is abnormally released, and re-establishing a dropped call in a mobile station in a CDMA system.

It is another object of the present invention to provide a method for automatically reconnecting a lost communication link effectively and rapidly without requiring the user to retry call origination after an abnormal call drop, in a mobile station in a CDMA system.

It is yet another object of the present invention to provide a method for performing, when a call is abnormally released, energy measurement on PN offset values of neighbor base stations, received from a previous service base station, determining a reference active sector, and automatically performing call re-establishment in a sync channel state or paging channel state according to whether the determined sector is identical to a previous reference active sector, so that the user is not required to redial and wait for a relatively long time before call re-establishment is made successfully, and the mobile station does not perform the conventional unnecessary initial pilot acquisition, thereby reducing the time required to recover the dropped call, and increasing the convenience of the user.

In accordance with one aspect of the present invention, A method for automatically recovering a call in a mobile station for a CDMA (Code Division Multiple Access) mobile communication system, the method comprising the steps of upon detection of an unintended dropped call, performing energy measurement on pilot signals of neighbor base stations and determining a base station according to the energy measurement, said pilot signals being received from a previous service base station; slewing, when the determined base station is not identical to the previous service base station, a PN offset timing position of the mobile station to a PN offset timing position corresponding to the determined base station; obtaining the system information of the determined base station by demodulating a sync channel message and a paging channel message from the determined base station; and performing automatic redialing on the dropped call.

In accordance with another aspect of the present invention, A method for automatically recovering a call in a mobile station in a CDMA mobile communication system, the method comprising the steps of upon detection of an unintended dropped call, transitioning from a traffic channel state to an unslew state; performing energy measurements on pilot signals received from previous service base station and neighbor base stations; determining a base station according to the energy measurement; slewing, when the determined base station is identical to the previous service base station, a PN offset timing position of the mobile station to a PN offset timing position of the previous service base station, and when the determined base station is not identical to the previous service base station, a PN offset timing position of the mobile station corresponding to the determined base station; state transitioning to a paging channel state and demodulating the paging channel message from the previous service base station; and performing automatic redialing on the dropped call.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail to avoid obscuring the invention in unnecessary detail.

Figure 1:
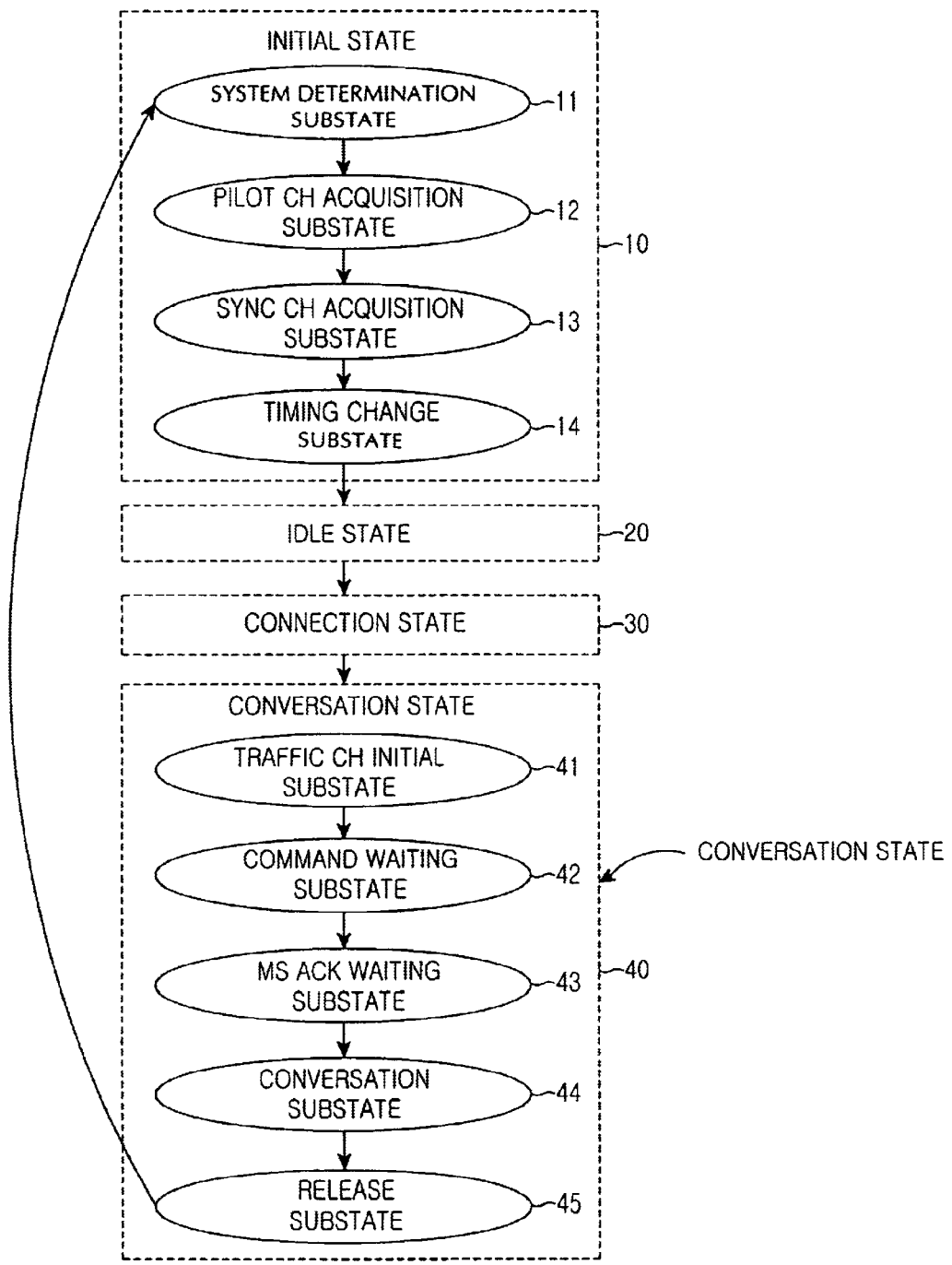
FIG. 1 is a diagram illustrating a procedure for processing a dropped call in a conventional main control task.
Figure 2:
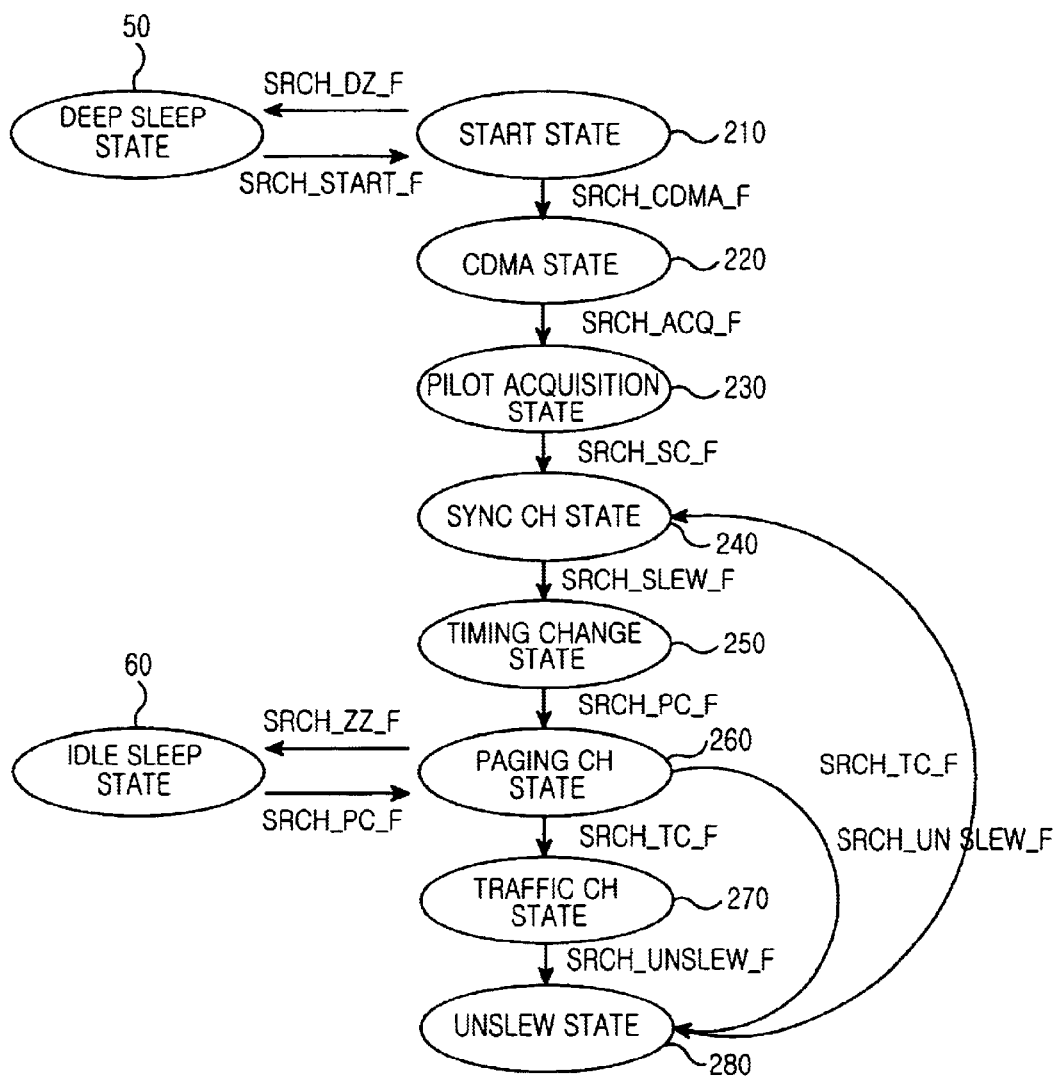
FIG. 2 is a state transition diagram of a conventional search task.
Figure 3:
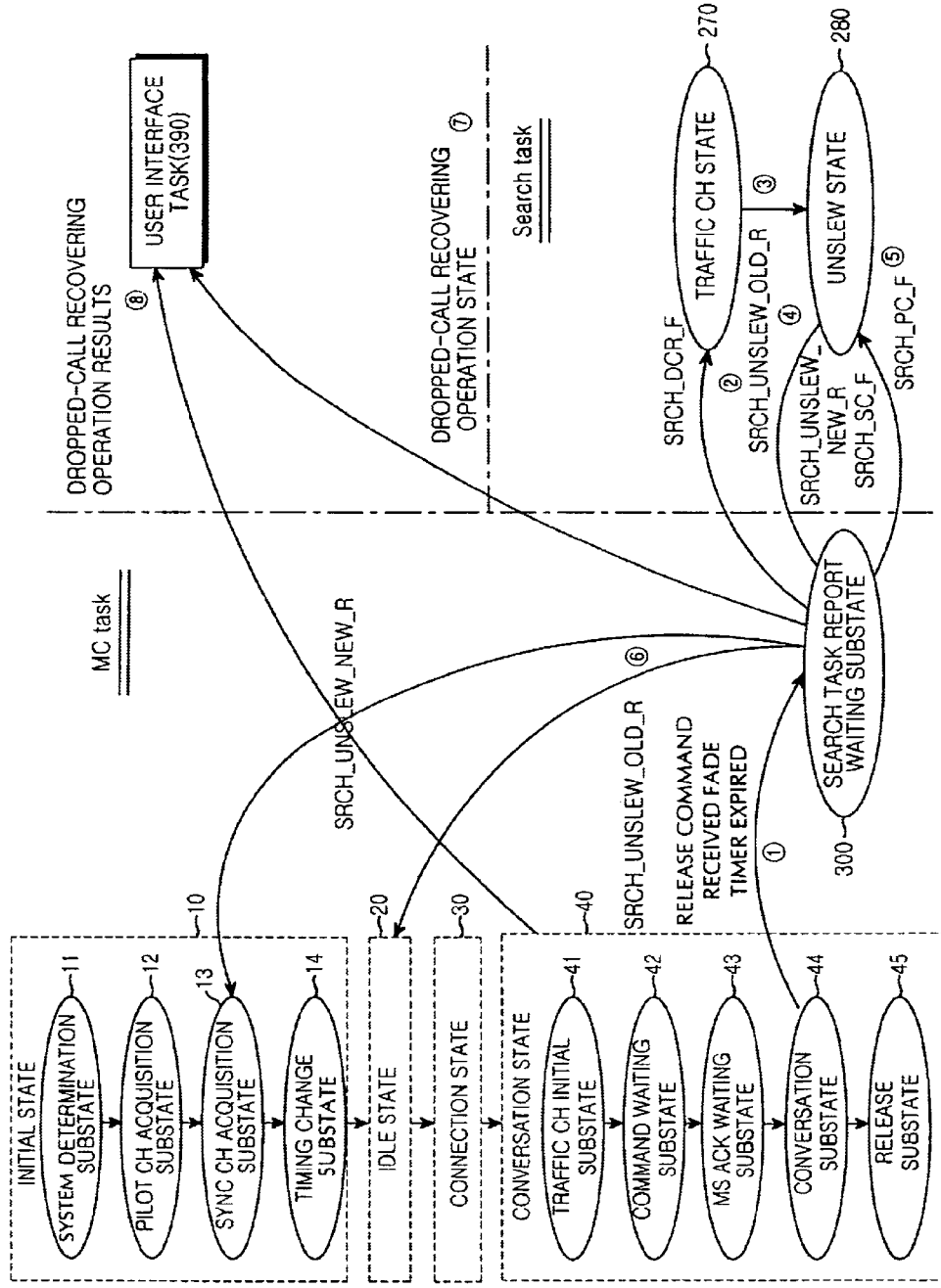
FIG. 3 is a diagram illustrating a procedure for processing a dropped call in a mobile station according to an embodiment of the present invention.
Figure 4:
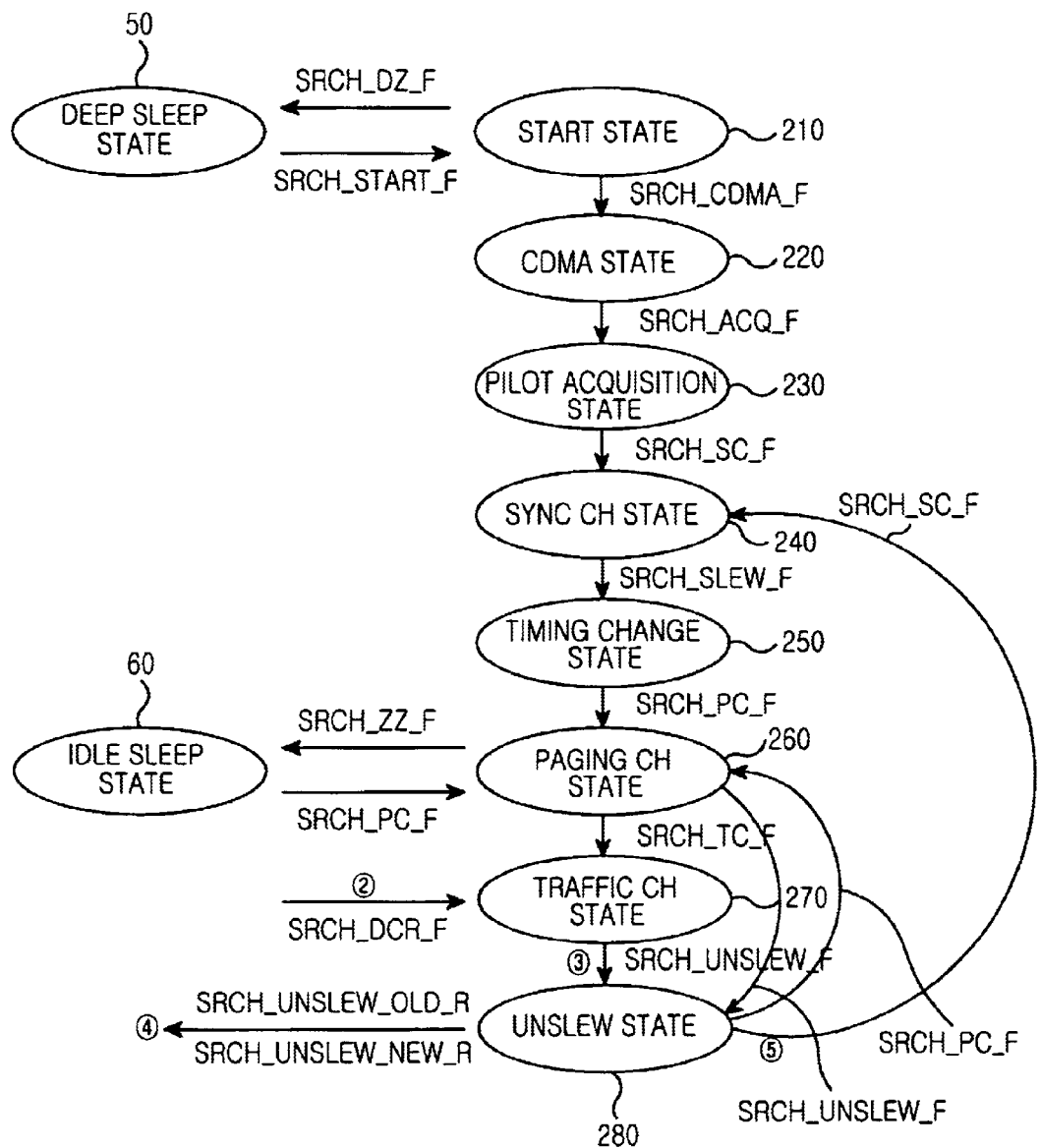
FIG. 4 is a state transition diagram of a search task for processing a dropped call according to an embodiment of the present invention.
Figure 6:
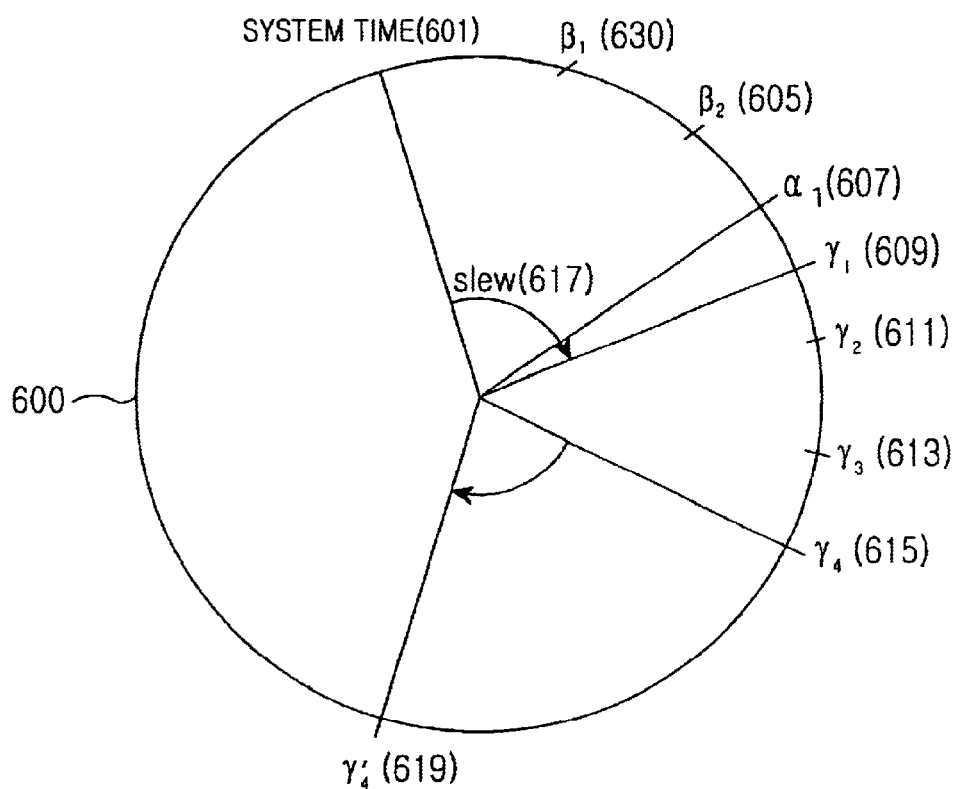
FIG. 6 is a diagram illustrating a slew operation on a PN circle in the case where a reference active sector set by a sector measuring method according to the present invention is not equal to a previous reference active sector.

FIG. 3 shows a procedure for processing a dropped call of a mobile station in a CDMA system according to an embodiment of the present invention. FIG. 4 shows a state transition diagram of a search task for processing a dropped call in a CDMA system according to an embodiment of the present invention. FIG. 6 shows a diagram illustrating a slew operation on a PN circle in the case where a reference active sector set by a sector measuring method according to the present invention is not equal to a previous reference active sector. With reference to the accompanying drawings, a detailed description will be made of a method for recovering an abnormally released call and notifying the user of the recovery of the dropped call according to the present invention.

In a mobile station in a CDMA system according to the present invention, every state defined in the main control (MC) task and the search task and the fundamental state transition structure are comparable to those in a conventional system. However, unlike the conventional method, the mobile station of the CDMA system according to the present invention rapidly recovers the dropped call by performing the operations represented by (1) to (6) of FIG. 3. Further, as shown in FIG. 3, while performing the operations (1) to (6), the main control task provides a user interface task 390 with a reconnection state report message represented by (7). The user interface task 390 then displays on a display of the mobile station a dropped-call recovering operation state for the user. When the dropped call is successfully recovered, the main control task provides the user interface task 390 with a dropped-call recovering result report message represented by (8). The user interface task 390 then displays on the display of the mobile station the dropped-call recovering result for the user.

When the call drop occurs during a conversation substate 44 of the conversation state 40 (for example, when a fade timer expires after receipt of a release command), the main control task transitions to a search task report waiting state 300 according to an embodiment of the present invention, as shown by (1). Here, the fade timer is a timer for checking whether bad frames have been received over a predetermined time. Next, the main control task provides the search task with a message SRCH_DCR_F for issuing a command for transition to a dropped-call recovering state, through the search task report waiting substate 300, as shown by (2). Further, the main control task provides the user interface task 390 with the reconnection state report message, as shown by (7). The user interface task 390 then displays the reconnection operating state for the user on the display of the mobile station.

Thereafter, the main control task waits for a report from the search task. Here, the possible report includes the messages SRCH_UNSLEW_OLD_R and SRCH_UNSLEW_NEW_R.

Meanwhile, upon receipt of the message SRCH_DCR_F for issuing a command for transition to the dropped-call recovering state transmitted from the main control task, the search task transitions from a traffic channel state 270 to an unslew state 280, as shown by (3). Here, the search task process for processing the dropped call according to the present invention is illustrated in FIG. 4.

However, since the call is abnormally released, energy values of the active, candidate and neighbor sectors being managed according to the present channel conditions have a low reliability. For example, the presently stored energy values for the above sectors may be lowered drastically. Therefore, in this embodiment, energy measurement is performed again on the sectors. However, since the mobile station previously knows PN offset values of the neighbor base stations by demodulating a message from the previous service base station, the mobile station can rapidly perform energy measurement on the above sectors by taking a correlation of the pilot signals from the neighbor base stations. For example, in the case where there are 6 active sectors, 6 candidate sectors and 20 neighbor sectors, if a time required for energy measurement of a single sector is 512 chips, and the number of hypotheses to be tested for a single sector is 40 chips, the total time required for sector measurement is 32 sectors×512 chips×40 chips×813≅533 msec. Here, 813 indicates one-chip time period (1/1.2288 M).

The sector measurement can include two embodiments. In a first embodiment, when a sector having an energy value higher than a threshold value is detected while the sectors are sequentially measured, a PN offset corresponding to the detected sector is determined. In a second embodiment, an energy value is measured for every sector and then a PN offset corresponding to a sector having the highest energy value is determined.

A detailed description will be made below regarding a sector search operation of the search task. The search task sequentially measures energies of the pilot signals with respect to the active sectors, candidate sectors and neighbor sectors, which were secured in the traffic channel state 270 under the unslew state 280. That is, the search task sequentially searches the active, candidate and neighbor sectors which were previously managed, to measure energies of the pilot signals. Further, the search task compares the measured pilot signal energy with a predetermined threshold value to set a sector having the energy value higher than the threshold value as a new reference active sector.

Figure 5A:
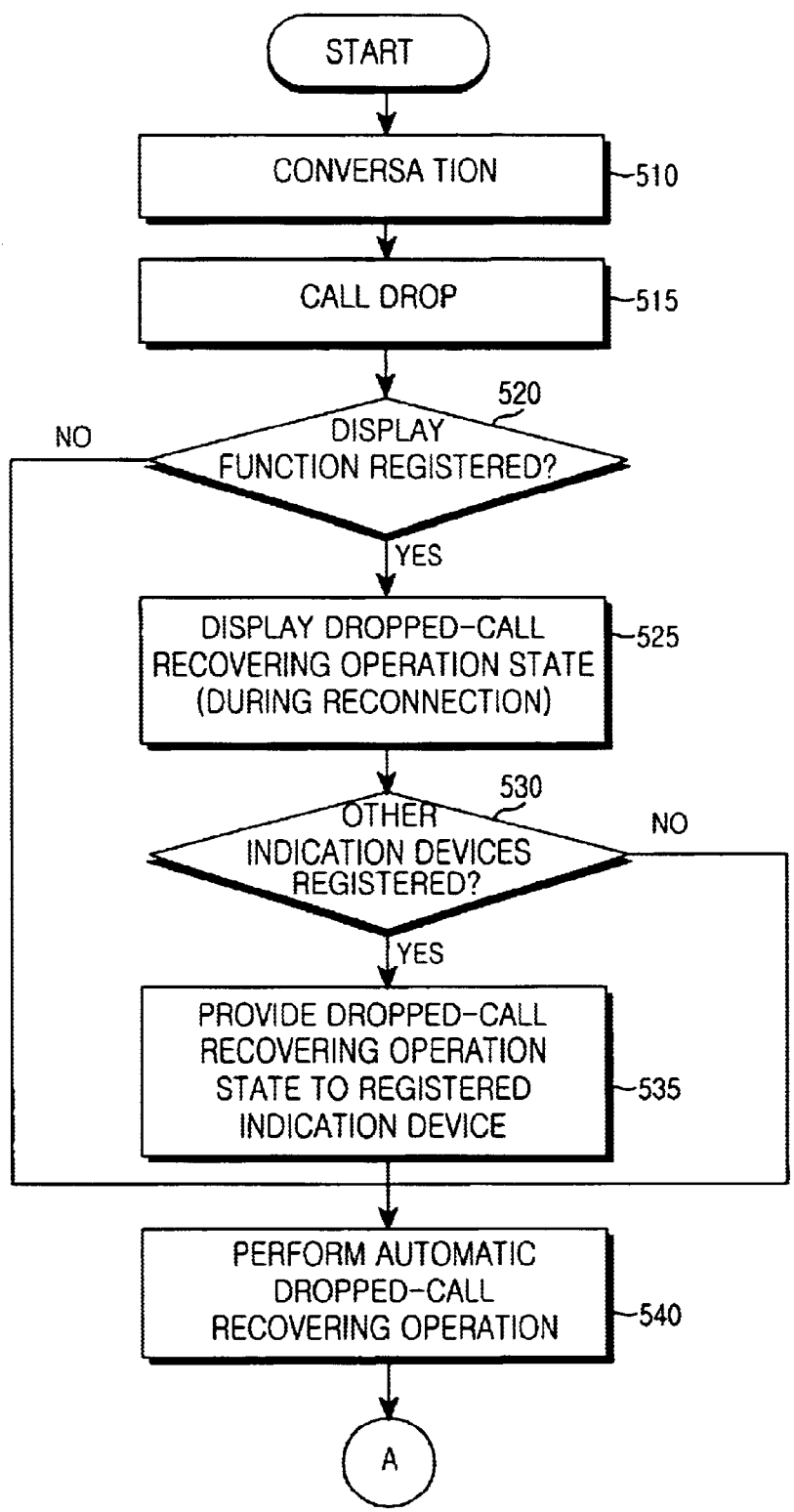
FIG. 5 is a flow chart illustrating a method for notifying a user of automatic recovery of a dropped call of a mobile station in a CDMA system according to an embodiment of the present invention.
Figure 5B:
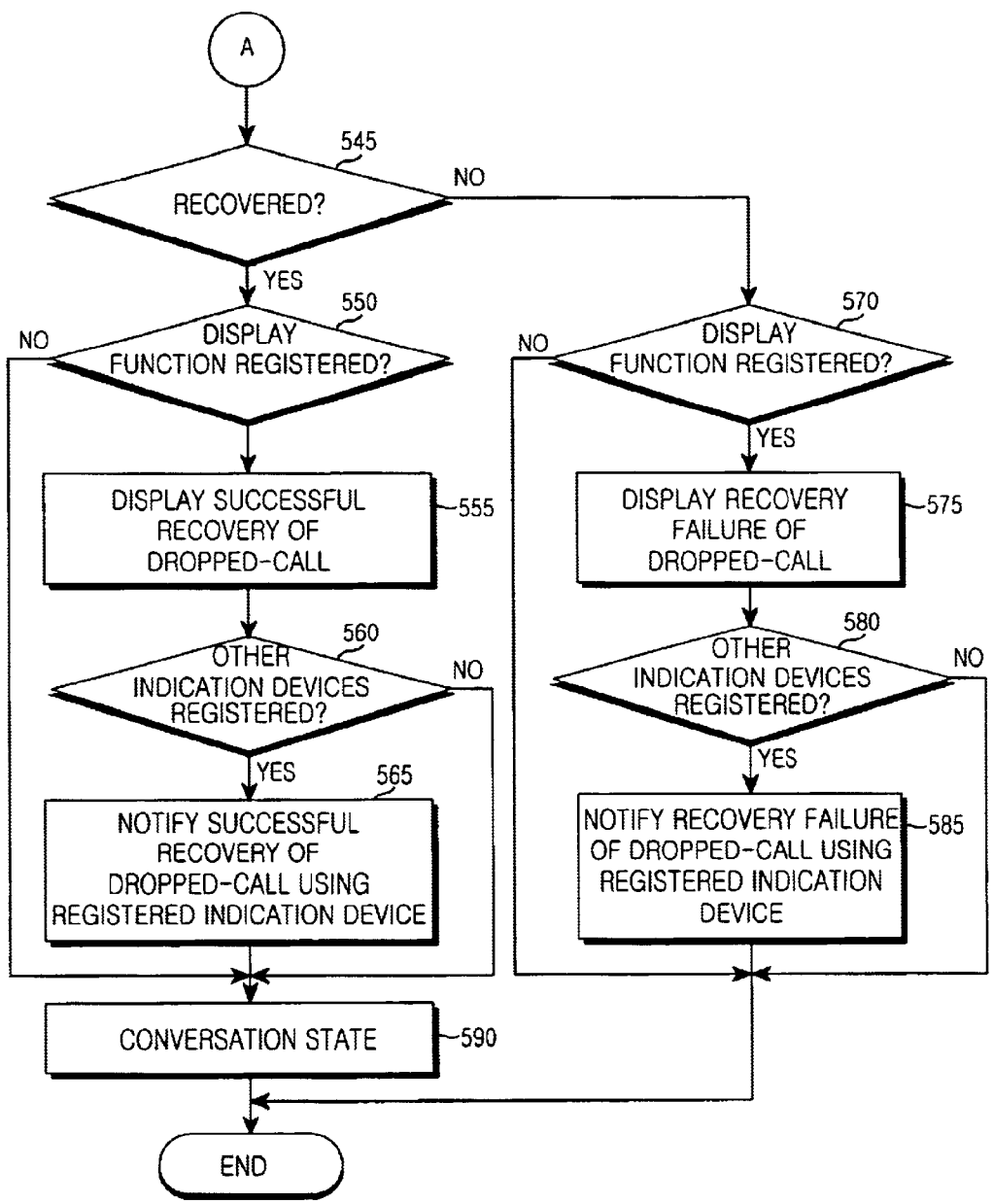

In addition, the search task determines whether the set reference active sector is identical to the existing reference active sector. Referring to FIG. 5, when the set reference active sector is not identical to the existing reference active sector, the search task slews (or shifts) a PN offset timing position ($\gamma_1$) 609 corresponding to the new reference active sector determined through the above measurement to a system time position 601. That is, for example, the search task slews the system timing position 601 of a PN generator included in the mobile station by the PN offset of the base station corresponding the measured sector. Accordingly, the system timing position of the hardware searcher and finger will also slew by the PN offset of the base station corresponding to the measured sector. In addition, a PN offset timing position ($\gamma_4$) 615 of the PN generator presently masked by the above sector measurement operation will slew to a position ($\gamma'_4$) 619 being apart from that position by a pilot offset for the base station corresponding to the sector determined through the above measurement operation. The above slew operation is a previous operation for a multipath search for demodulating a sync channel from the base station corresponding to the sector set by the sector search method of the invention after the search task enters the sync channel state.

Referring again to FIG. 3, the search task transmits to the main control task a message SRCH_UNSLEW_NEW_R for informing that the set reference active sector is not identical to the existing reference active sector, as shown by (4). The main control task then transmits to the search task a message SRCH_PC_F for issuing a command for transition from the unslew state 280 to the sync channel state 240, as shown by (5).

FIG. 6 shows a slew operation on a PN circle in the case where a reference active sector set by a sector measuring method according to the present invention is not equal to a previous reference active sector.

For reference, a description will be first made of a concept of the PN circle. In the CDMA system, when a transmitter spreads an information signal with a PN sequence of a high data rate and transmits the spread signal, a corresponding receiver despreads the signal received in sync with a PN sequence of the transmitter using a PN sequence of the receiving side thereby to demodulate the information signal. Further, in the CDMA system, the channel-encoded random data signals or symbols are orthogonally spread with an orthogonal code for data transmission, and the sequences of the orthogonally spread data signals are then PN spread with a PN sequence having a rate of 1.2288 MHz. The pilot signal can be generated such that a non-modulated signal comprised of consecutive +1's is orthogonally spread with an orthogonal code such as a Walsh orthogonal code, and the orthogonally spread pilot signal is then PN spread with a PN sequence. That is, the non-modulated signal comprised of consecutive +1's is orthogonally spread with the orthogonal code $W_o$ and the orthogonally spread sequences are then PN spread with the PN sequence, thereby generating the pilot signal.

The PN sequence can have a period of 32768 chips, wherein a ratio of +1 to −1 values is 50%. In addition, each base station has a unique PN sequence phase start point, i.e., unique PN offset. The mobile station searches the PN sequence included in the pilot signal in order to acquire synchronization with the base station. In general, such a PN sequence having a period of 32768 is expressed in a PN circle.

In FIG. 6, reference numeral 601 denotes a system time that the mobile station has acquired by performing initial pilot acquisition. Reference numerals 603 to 615 denote PN offset timing positions corresponding to the active, candidate and neighbor sectors, which are presently managed by the mobile station. $\alpha_1$ 607 denotes a PN offset position corresponding to the previous service base station from which the call was abnormally released. $\gamma_1$ 609 denotes a PN offset position corresponding to a new sector determined by the sector measuring method of the invention. That is, FIG. 6 shows a case where the set reference active sector is not identical to the previous reference active sector.

Therefore, as shown by the rotational arrow 617, the search task slews the system timing position 601 of the PN generator included in the mobile station by a PN offset of the base station corresponding to the measured sector $\gamma_1$ 609. $\gamma_4$ 615 denotes a PN offset timing position of a PN generator masked immediately after the search task performs sector measurement according to the present invention. The PN offset timing position of the PN generator presently masked in the above sector measuring method is slewed to the position $\gamma'_4$ 619, which is apart from that position by the pilot offset for the base station corresponding to the sector determined in the above sector measuring method.

On the other hand, as shown in FIG. 4, when the new reference active sector set by the sector measuring method of the invention is identical to the existing reference active sector, the search task transmits to the main control task the message SRCH_UNSLEW_OLD_R for informing that the set reference active sector is identical to the existing reference active sector, as shown by (4). The main control task then transmits to the search task the message SRCH_PC_F for issuing a command for transition from the unslew state 280 to the paging channel state 260, as shown by (5).

Referring to FIG. 4, when the new reference active sector set by the sector measuring method of the invention is not identical to the existing reference active sector, the search task transitions from the unslew state 280 to the sync channel state 240 upon receipt of the message SRCH_SC_F. In the sync channel state 240, the mobile station demodulates a sync channel message from the service base station corresponding to the new reference active sector. The message includes a system time, a long code state and a data rate of the paging channel. Further, the search task transitions to the paging channel state 260 through a timing change state 250. The mobile station demodulates the paging channel message in the paging channel state 260. The paging channel message includes environment information for the base station and the mobile station. Thereafter, when the automatic call re-establishment process of the invention is performed successfully, the search task transitions to the traffic channel state 270.

Referring again to FIG. 3, when the new reference active sector set by the sector measuring method of the invention is not identical to the existing reference active sector, the main control task transitions from the search task report waiting state 300 to a sync channel acquisition substate 13. Further, the main control task transitions to the conversation state 40 via timing change substate 14, idle state 20 and connection state 30. In the connection state 30, the main control task performs automatic redialing on the dropped call. In the conversation state 40, the main control task transmits a reconnection result report message to the user interface task 390, as shown by (8). The user interface task 390 then notifies the user of the present reconnection operating state of the mobile station using the display of the mobile station. Accordingly, even though the call is dropped during conversation, the user can easily ascertain whether the call is automatically reconnected or not during the call reconnection state.

Turning back to FIG. 4, when the new reference active sector set by the sector measuring method of the invention is identical to the existing reference active sector, the search task transitions from the unslew state 280 to the paging channel state 260 upon receipt of the message SRCH_PC_F from the main control task. The mobile station demodulates the paging channel message in the paging channel state 260. The paging channel message includes environment information for the base station and the mobile station. Thereafter, when the automatic call reorigination of the invention is performed successfully, the search task transitions to the traffic channel state 270.

Referring back to FIG. 3, when the new reference active sector set by the sector measuring method of the invention is identical to the existing reference active sector, the main control task transitions from the search task report waiting state 300 to the idle state 20. Further, the main control task transitions to the conversation state 40 via the connection state 30. In the connection state 30, the main control task performs automatic redialing on the dropped call. In the conversation state 40, the main control task transmits a reconnection result report message to the user interface task 390, as shown by (8). The user interface task 390 then notifies the user of the present reconnection operating state of the mobile station using the display of the mobile station. Accordingly, even though the call is dropped during conversation, the user can easily ascertain whether the call is automatically reconnected or not during the call reconnection state.

FIG. 5 illustrates a method for notifying a user of automatic recovery of a dropped call of a mobile station in a CDMA system according to an embodiment of the present invention.

When the call is abnormally released during a conversation state (of step 510) in step 515, the mobile station performs the automatic dropped-call recovering operation according to the present invention and determines in step 520 whether an automatic dropped-call recovering state displaying function is registered or not. That is, the user can determine whether to display the automatic dropped-call recovering state according to the present invention. When the displaying function is registered, the mobile station automatically recovers the dropped call and displays the dropped-call recovering operation state on the display thereof, in step 525.

The mobile station determines in step 530 whether the dropped-call recovering indication function is additionally registered in other indication devices. The other indication devices can include devices for generating a bell sound, specific tone, vibration, melody and voice alarm. When the dropped-call recovering indication function is registered in any one of the other indication devices, the mobile station notifies the user that the dropped call is being automatically recovered, using the corresponding indication device, in step 535.

In step 540, the mobile station performs the automatic dropped-call recovering operation. The operation corresponds to the operations shown in FIGS. 3, 4 and 6. The mobile station examines in step 545 whether the above operation is performed successfully. When the above operation is performed successfully, the mobile station determines, in step 550, whether the automatic dropped-call recovering function is registered to be displayed on the display of the mobile station. If so, the mobile station notifies the user in step 555 that the automatic dropped-call recovering operation is performed successfully, using the display thereof. Thereafter, the mobile station determines in step 560 whether the automatic dropped-call recovering function is additionally registered in other indication devices. When the automatic dropped-call recovering function is registered in any one of the other indication devices, the mobile station notifies the user about the successful recovery of the dropped-call using the corresponding indication device and disables the display device, in step 565. Thereafter, the mobile station performs the conversation state in step 590.

On the other hand, when the automatic dropped-call recovering operation is not performed successfully in step 545, the mobile station examines in step 570 whether the automatic dropped-call recovering function is registered to be displayed on the display. If so, the mobile station notifies the user that the automatic recovering operation has failed, using the display, in step 575. Thereafter, the mobile station determines in step 580 whether the automatic dropped-call recovering function is additionally registered in other indication devices. When the automatic dropped-call recovering function is registered in any one of the other indication devices, the mobile station notifies the user of recovery failure of the dropped-call using the corresponding indication device and disables the display device, in step 585.

In sum, when the call is abnormally released, the novel mobile station does not repeat initial pilot acquisition. The mobile station performs energy measurement on PN offset values of the neighbor base stations, received from the previous service base station, to determine a reference active sector. Based on whether the determined sector is identical to the previous reference active sector, call re-origination is performed from the sync channel state or the paging channel state. Accordingly, the user does not have to redial and wait for a relatively long time until the call re-establishment is performed successfully. In addition, the mobile station does not need to perform initial pilot acquisition unnecessarily, which reduces the time required for recovering the dropped call.

In addition, the mobile station notifies the user of the dropped-call recovering operation state using a predetermined method, so that the user can know the present call condition and the operation state of the mobile station.

As described above, in the CDMA system, the novel mobile station rapidly recovers the dropped call and re-establishes the communication link. Further, the mobile station rapidly recovers the dropped call and forms the communication link even without performing initial acquisition on the pilot signal. In addition, the mobile station notifies the automatic dropped-call recovering operation state in a predetermined method, so that the user can know the present call condition and the operational state of the mobile station. Therefore, the user does not need to perform call re-establishment manually.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for automatically recovering a call in a mobile station for a CDMA (Code Division Multiple Access) mobile communication system, the method comprising the steps of:
   (a) upon detection of an unintended dropped call, performing energy measurement on pilot signals of neighbor base stations and determining a base station according to the energy measurement, said pilot signals being received from a previous service base station;

(b) slewing, when the determined base station is not identical to the previous service base station, a PN offset timing position of the mobile station to a PN offset timing position corresponding to the determined base station;

(c) obtaining the system information of the determined base station by demodulating a sync channel message and a paging channel message from the determined base station; and (d) performing automatic redialing on the dropped call.

2. The method as claimed in claim 1, wherein in the step (b), the PN offset timing position of the mobile station is slewed to match the timing position of a PN offset of the determined base station according to the energy measurement results.

3. The method as claimed in claim 1, further comprising the steps of:

upon detection of the unintended dropped call, notifying a user of an automatic dropped-call recovering operation state; and notifying the user of a result of the automatic redialing results performed on the dropped call.

4. The method as claimed in claim 1, wherein the energy measurement operation sequentially measures energies of pilot signals corresponding to the PN offset values of the neighbor base stations, and determines a base station corresponding to a pilot signal having an energy value higher than a predetermined threshold value.

5. The method as claimed in claim 1, wherein the energy measurement operation measures energies of the pilot signals corresponding to the PN offset values of the neighbor base stations, and determines a base station corresponding to a pilot signal having the highest energy value.

6. A method for automatically recovering a call in a mobile station in a CDMA mobile communication system, the method comprising the steps of:

(a) upon detection of an unintended dropped call, transitioning from a traffic channel state to an unslew state;

(b) performing energy measurements on pilot signals received from previous service base station and neighbor base stations;

(c) determining a base station according to the energy measurement (d) slewing, when the determined base station is identical to the previous service base station, a PN offset timing position of the mobile station to a PN offset timing position of the previous service base station, and when the determined base station is not identical to the previous service base station, a PN offset timing position of the mobile station corresponding to the determined base station;

(e) state transitioning to a paging channel state and demodulating the paging channel message from the previous service base station; and (f) performing automatic redialing on the dropped call.

7. The method as claimed in claim 6, wherein in the step (d), the timing position of a PN offset of the mobile station is slewed to match the timing position of a PN offset of the previous service base station.

8. The method as claimed in claim 6, further comprising the steps of:

upon detection of the dropped call, notifying a user of an automatic dropped-call recovering operation state; and notifying the user of a result of the automatic redialing on the dropped call.

9. The method as claimed in claim 6, wherein the energy measurement operation sequentially measures energies of pilot signals corresponding to the PN offset values of the previous service base station and the neighbor base stations, and determines a reference active sector corresponding to a pilot signal having an energy value higher than a predetermined threshold value.

10. The method as claimed in claim 6, wherein the energy measurement operation measures energies of the pilot signals corresponding to the PN offset values of the previous service base station and the neighbor base stations, and determines a base station corresponding to a pilot signal having the highest energy value.

* * * * *